United States Patent Office 3,544,673
Patented Dec. 1, 1970

3,544,673
PROCESS FOR HEAT TREATING FABRICATED PLASTIC ARTICLES
Mark D. Inskeep, Saddle River, and Walter T. Zagar, Wayne, N.J., assignors to Allied Chemical Corporation, New York, N.Y., a corporation of New York
No Drawing. Filed Oct. 12, 1967, Ser. No. 674,748
Int. Cl. B29c 24/00, 25/00
U.S. Cl. 264—235                                6 Claims

ABSTRACT OF THE DISCLOSURE

Process for producing articles having improved stiffnes and stress crack resistance and which will not change substantially in volume when subjected to subsequent temperature fluctuations or long term storage. Polyethylene and copolymers thereof are formed into hollow containers by a stress inducing fabrication step at temperatures from about 150° C. to 320° C. and the containers are cooled to below the crystalline freeze point thereof. The containers are subsequently heated at a temperature ranging from the crystalline freeze point to the melting point thereof for a period of time ranging from 4 to 10 minutes and are then cooled to a temperature substantially below the crystalline freeze point thereof.

BACKGROUND OF THE INVENTION

This invention relates to a process for heat treating fabricated plastic articles. It is known to heat treat self supporting plastic shapes at temperatures below the crystalline freeze point of the polymer to obtain various properties. Examples of such heat treatment can be found in U.S. Pat. No. 3,293,341 and in the Journal of Polymer Science, vol. 7, pp. 515–531 (1963).

STATEMENT OF INVENTION

In accordance with this invention, it has been found that the heat treatment at a temperature ranging from the crystalline freeze point to the softening point of articles fabricated from a polymer comprising a mono-1-olefin results in products having excellent bleach crack resistance, stress-crack resistance and stiffness properties, as well as being preshrunk to a size which will not vary considerably when the product is subjected to subsequent temperature fluctuations or long term storage.

More specifically this invention resides in a process for fabricating articles from a mono-1-olefin polymer preferably high density polyethylene, which process comprises the following steps:

(1) Subjecting the polymer to a stress inducing fabrication step such as blow molding; to produce a self-supporting article.

(2) Cooling the article to a temperature below the crystalline freeze point of the polymer.

(3) And subsequently heating the article to a temperature ranging from the crystalline freeze point of the polymer to the softening point thereof.

By this process it has been found that certain properties of the fabricated articles can be varied as desired by changing the process conditions slightly so as to produce an article having the requisite properties depending on the particular application to which it will be put.

The polymers particularly useful in the invention are thermoplastic polymers of a mono-1-olefin and are prepared from a monomer having 2 to 6 carbon atoms per molecule. Examples of such polymers are polyethylene, polypropylene, copolymers of ethylene and propylene, ethylene and butene-1, and the like. These polymers may also be combined with minor amounts of other thermoplastic resins such as Nylon-6, etc. Particularly good results are obtained with high density polyethylene homopolymers and copolymers of ethylene and butene-1. High density polyethylene may be defined as a polymer having a nominal density of about .940 to .970 according to ASTM D–1505 on samples prepared under ASTM D–1928–62T (Procedure A). Actual fabricated object densities will range from about .935 to .965 gm./cc.

The polymers of this invention may also contain additives such as lubricants, antioxidants, antistatic agents, etc. Particularly good results have been obtained when using polymers containing antistatic agents such as a long chain alkyl diethanol amine in amounts ranging from about 0.05% to 0.60% by weight of the polyethylene.

The stress inducting fabrication step includes most standard fabrication techniques such as blow molding, forming sheet, injection molding and the like. The fabrication step will generally take place at a temperature ranging from about 150° C. to 320° C. During or after fabrication the item is generally quickly cooled to a temperature ranging from 30° C. to 60° C. so as to be self-supporting. Further fabrication steps such as cold forming may also be performed on the article after the initial fabrication step, and before or after the heat treatment noted below.

The heat treatment is carried out at a temperature ranging from the crystalline freeze point to the softening point of the polymer, preferably between 124° and 127° C.

The crystalline freeze point of the polymer is determined by inserting a thermocouple into a sample of molten polymer and allowing the molten polymer to cool slowly. This rate is approximately 10° C. per minute in the interval between the melting point and freezing point. Temperature and time are then recorded and plotted against each other. The crystalline freeze point is reached at a point in the time versus temperature curve when the first plateau is reached. This temperature is generally conceded to be about 122° C. in the case of high density polyethylene, copolymers of ethylene and butene, and polypropylene.

The softening point of the polymer is determined by annealing fabricated objects at successively higher tempertures near the melting point. It is the temperature at which the first major distortion of the object occurs. It is approximately 129° C. for polyethylene and 128° C. for ethylene-butene-1 copolymers containing up to 1.9 weight percent butene-1.

The duration of the heat treatment is that time required to provide the desired properties of improved stress crack resistance and stiffness. Generally, it ranges from 1–15 minutes, preferably about 4–10 minutes.

Several examples are set forth below to illustrate the nature of the invention and the manner of carrying it out. However, the invention should not be considered as being limited to the details thereof.

In the examples stiffness is determined as follows:

The bottle is placed in a Baldwin testing machine equipped with parallel plate jaw faces and a strain-gage compression transducer. A compressive force versus deformation curve is read at a 2 inches per minute jaw advance rate. The force necessary to produce the first major buckling collapse of the bottle (10 to 50% deformation) is read as the stiffness.

Stress crack resistance is determined as follows:

(A) Fill container to one third nominal capacity with 15% solution in water of a non-ionic alkyl phenyl polyethylene oxide surfactant (Igepal CO630).

(B) Seal container at mouth thereof into a constant pressure adapter.

(C) After sealing invert container to coat the inside with the Igepal solution.

(D) Place containers in vertical upright position in constant pressure apparatus in oven at test temperatures of 60° C.±1° C. and constant internal pressure of 5±.1 p.s.i.g.

(E) Inspect containers for stress crack failure at periodic intervals.

A container is considered to have failed (1) when pressure is lost (through any aperture other than the sealed area), (2) when there is visible to an observer with normal eyesight any crack completely through the container wall; or (3) there is evidence of the Igepal solution on the outside of the container (through any aperture other than the one at the seal area).

Bleach cracking resistance is determined by a similar procedure using commercial hypochlorite bleach solution (Clorox). In this case the bottle is sealed and capped and the pressure allowed to build up on the decomposition of the bleach.

The specimens were 12 oz. bottles, molded on standard blow molding equipment.

Examples 1 and 2 were run using bottles of different weights made from high density ethylene-butene-1 copolymers having a nominal density of .950. These bottles were blow molded and cooled to ambient room temperature. They were subsequently heat treated in an oven for the indicated time after a 3 minute pre-heat to bring the oven back to temperature after the bottle was inserted therein. Results are as follows:

| Example | Bottle weight, gm. | Oven temp., °C. | Duration of heat treatment, minutes | Top loading stiffness, lbs. |
|---|---|---|---|---|
| 1 | 19 | 125 | 5 | 11.8 |
| 2 | 23 | 125 | 5 | 23.1 |

Examples 3-10 were run using 12 oz. bottles of different weights molded from polyethylene of .958 nominal density. Molding and heat treating conditions are similar to Example 1, except as noted. A long chain alkyl diethanol amine antistatic agent was used in concentration of 0.1% by weight based on the polyethylene.

| Example | Bottle weight, gms. | Oven temp., °C. | Duration of heat treatment, min. | Top loading stiffness, lbs. | Stress crack resistance, hours | Bleach crack resistance, hours |
|---|---|---|---|---|---|---|
| 3 | 21.5 | 125 | 10 | 10.8 | 44.7 | 285 |
| 4 | 21.5 | 125 | 6 | 11.1 | 22.2 | 204 |
| 5 | 21.5 | 125 | 4 | 9.0 | 2.8 | 162 |
| 6 | 21.5 | 127 | 10 | 12.7 | 16.9 | 245 |
| 7 | 21.5 | 127 | 6 | 10.4 | 24.3 | 240 |
| 8 | 21.5 | 127 | 4 | 8.6 | 24.1 | 162 |
| 9 | 19.5 | 127 | 10 | 10.7 | | |
| 10 | 23.7 | 127 | 10 | 20.7 | | |

EXAMPLE 11

Injection mold polyethylene homopolymer having a nominal density of .960 gm./cc. into a preform and subsequently subject the preform to a cold forming step to form it into a hollow container having one end closed and substantially cylindrical side walls. Heat the cold formed container at 125° C. for 4 minutes after a 2 minute pre-heat. Remove article from oven and cool to ambient room temperature.

While exemplary embodiments of the invention have been described, the true scope of the invention is to be determined from the following claims:

What is claimed is:

1. A process for fabricating and heat treating a hollow container from a thermoplastic material selected from the group consisting of polyethylene and a copolymer of ethylene with a mono-1-olefin having 3–6 carbon atoms comprising the steps of:
   subjecting said thermoplastic material to a stress inducing fabrication step at a temperature in the range of about 150° C. to 320° C. to produce a self supporting hollow container;
   cooling said container to below the crystalline freeze point of said thermoplastic material; and subsequently heating said article at a temperature ranging from the crystalline freeze point to the melting point of said thermoplastic material for a period of time ranging from 4 to 10 minutes; and thereafter
   again cooling said container to a temperature substantially below the crystalline freeze point of said thermoplastic material.

2. The process of claim 1 wherein the thermopalstic material contains a long chain alkyl diethanol amine present in amounts ranging from 0.05% to 0.60% based on the weight of the polymer.

3. The process according to claim 1 wherein the thermoplastic material has a nominal density of about .940 to .970 gm./cc. and is selected from the group consisting of polyethylene and copolymers of ethylene and butene-1.

4. The process of claim 3 wherein the fabrication step is injection molding a preform, and the preform is subjected to a cold forming step subsequent to its being molded.

5. The process of claim 4 wherein the cold forming step is performed prior to the heating step.

6. The process of claim 4 wherein the cold forming step is performed after the heating step.

(References on following page)

References Cited

UNITED STATES PATENTS

| | | | |
|---|---|---|---|
| 2,957,205 | 10/1960 | Barber et al. | 264—(Reshape Digest) |
| 3,383,375 | 5/1968 | Van der Vegt et al. | 264—235 X |
| 2,990,580 | 7/1961 | Foster | 264—346 X |
| 3,293,341 | 12/1966 | Boeke et al. | 264—235 X |
| 3,317,642 | 5/1967 | Bailey | 264—235 X |

OTHER REFERENCES

Dunlop, R. I., Pokigo, F. J., Glick, S. E.: "Annealing Injection-Molded Styrene," Modern Plastics, August 1950, (pp. 83, 86, 88, and 89) [264/235].

ROBERT F. WHITE, Primary Examiner

J. H. SILBAUGH, Assistant Examiner

U.S. Cl. X.R.

264—294, 346

PO-1050
(5/69)

UNITED STATES PATENT OFFICE
CERTIFICATE OF CORRECTION

Patent No. 3,544,673           Dated   December 1, 1970

Inventor(s) Mark D. Inskeep and Walter T. Zagar

It is certified that error appears in the above-identified patent and that said Letters Patent are hereby corrected as shown below:

Column 1, line 14, "nes" should read -- ness --.

Column 2, line 23, "inducting" should read -- inducing --.

Column 2, line 52, "pertures" should read -- peratures --.

Column 4, in table, Example 5 under heading "Stress Crack Resistance, hours", "2.8" should read -- 28 --.

Column 4, line 58, "thermopalstic" should read -- thermoplastic --.

Signed and sealed this 30th day of March 1971.

(SEAL)
Attest:

EDWARD M. FLETCHER, JR.          WILLIAM E. SCHUYLER, JR.
Attesting Officer                Commissioner of Patents